United States Patent
Psaropoulos et al.

(10) Patent No.: US 10,733,185 B2
(45) Date of Patent: Aug. 4, 2020

(54) ACCESS PATTERN BASED OPTIMIZATION OF MEMORY ACCESS

(71) Applicant: SAP SE, Walldorf (DE)

(72) Inventors: Georgios Psaropoulos, Lausanne (CH); Thomas Legler, Walldorf (DE); Norman May, Karlsruhe (DE); Anastasia Ailamaki, Morges (CH)

(73) Assignee: SAP SE, Walldorf (DE)

( * ) Notice: Subject to any disclaimer, the term of this patent is extended or adjusted under 35 U.S.C. 154(b) by 208 days.

(21) Appl. No.: 15/915,797

(22) Filed: Mar. 8, 2018

(65) Prior Publication Data
US 2019/0278858 A1  Sep. 12, 2019

(51) Int. Cl.
*G06F 16/2453* (2019.01)

(52) U.S. Cl.
CPC .. *G06F 16/24542* (2019.01); *G06F 16/24537* (2019.01); *G06F 16/24539* (2019.01)

(58) Field of Classification Search
CPC .............. G06F 12/0862; G06F 11/073; G06F 16/24542
See application file for complete search history.

(56) References Cited

U.S. PATENT DOCUMENTS

| | | | | |
|---|---|---|---|---|
| 6,003,115 A | * | 12/1999 | Spear | G06F 12/0862 711/113 |
| 9,798,754 B1 | * | 10/2017 | Shilane | G06F 12/0862 |
| 2008/0307172 A1 | * | 12/2008 | Abe | G06F 11/073 711/156 |
| 2018/0089085 A1 | * | 3/2018 | Kothinti Naresh | G06F 12/0862 |

\* cited by examiner

*Primary Examiner* — Etienne P Leroux
(74) *Attorney, Agent, or Firm* — Mintz Levin Cohn Ferris Glovsky and Popeo, P.C.

(57) ABSTRACT

A method for optimizing memory access for database operations is provided. The method may include identifying an access pattern associated with a database operation. The access pattern may include data required to perform the database operation. One or more memory pages may be generated based at least on the access pattern. The one or more memory pages may include at least a portion of the data required to perform the database operation. The one or more memory pages including at least the portion of the data required to perform the database operation may be stored in a main memory. The database operation may be performed by at least loading, from the main memory and into a cache, the one or more memory pages including at least the portion of the data required to perform the database operation. Related systems and articles of manufacture, including computer program products, are also provided.

15 Claims, 7 Drawing Sheets

ACCESS PATTERN BASED OPTIMIZATION OF MEMORY ACCESS

TECHNICAL FIELD

The subject matter described herein relates generally to database processing and more specifically to techniques for optimizing memory accesses for database operations.

BACKGROUND

A database may be configured to store a plurality of electronic data records. The database may be coupled with a database management system (DBMS) that supports a variety of database operations for accessing the data records held in the database including, for example, structured query language (SQL) queries and/or the like. Performing a database operation may cause a cache miss if the database operation requires data that is absent from a processor cache. The cache miss may further trigger one or more accesses to a main memory in order to fetch the data required to perform the database operation. For example, the database operation may require data from a portion of an index such as, for example, a dictionary and/or the like, that is not found in the processor cache. As such, the main memory may be accessed in order to fetch the portion of the index required to perform the database operation.

SUMMARY

Systems, methods, and articles of manufacture, including computer program products, are provided for optimizing memory access. In one aspect, there is provided a system. The system may include at least one data processor and at least one memory. The at least one memory may store instructions that result in operations when executed by the at least one data processor. The operations may include: identifying an access pattern associated with a database operation, the access pattern comprising data required to perform the database operation; generating, based at least on the access pattern, one or more memory pages including at least a portion of the data required to perform the database operation; storing, in a main memory, the one or more memory pages including at least the portion of the data required to perform the database operation; and performing the database operation by at least loading, from the main memory and into a cache, the one or more memory pages including at least the portion of the data required to perform the database operation.

In some variations, one or more features disclosed herein including the following features can optionally be included in any feasible combination. The database operation may be a binary search on an index comprising a sorted array, and wherein the data required to perform the database operation comprises a first middle element of the sorted array. The one or more memory pages may include the first middle element. The data required to perform the database operation may further include a second middle element of a first half interval of the sorted array and/or a third middle element of a second half interval of the sorted array. The one or more memory pages may further include the second middle element and/or the third middle element.

In some variations, the generation of the one or more memory may reduce a frequency of cache misses when the one or more memory pages are loaded into the cache. The cache miss may occur due to the data required to perform the database operation being absent from the cache.

Implementations of the current subject matter can include, but are not limited to, methods consistent with the descriptions provided herein as well as articles that comprise a tangibly embodied machine-readable medium operable to cause one or more machines (e.g., computers, etc.) to result in operations implementing one or more of the described features. Similarly, computer systems are also described that may include one or more processors and one or more memories coupled to the one or more processors. A memory, which can include a non-transitory computer-readable or machine-readable storage medium, may include, encode, store, or the like one or more programs that cause one or more processors to perform one or more of the operations described herein. Computer implemented methods consistent with one or more implementations of the current subject matter can be implemented by one or more data processors residing in a single computing system or multiple computing systems. Such multiple computing systems can be connected and can exchange data and/or commands or other instructions or the like via one or more connections, including, for example, to a connection over a network (e.g. the Internet, a wireless wide area network, a local area network, a wide area network, a wired network, or the like), via a direct connection between one or more of the multiple computing systems, etc.

The details of one or more variations of the subject matter described herein are set forth in the accompanying drawings and the description below. Other features and advantages of the subject matter described herein will be apparent from the description and drawings, and from the claims. While certain features of the currently disclosed subject matter are described for illustrative purposes in relation to web application user interfaces, it should be readily understood that such features are not intended to be limiting. The claims that follow this disclosure are intended to define the scope of the protected subject matter.

DESCRIPTION OF DRAWINGS

The accompanying drawings, which are incorporated in and constitute a part of this specification, show certain aspects of the subject matter disclosed herein and, together with the description, help explain some of the principles associated with the disclosed implementations. In the drawings.

When practical, similar reference numbers denote similar structures, features, or elements.

DETAILED DESCRIPTION

A database operation requiring data that is absent from a processor cache may cause a cache miss. As noted, a cache miss may trigger one or more access to a main memory in order to fetch the data absent from the processor cache. But accessing the main memory may increase the runtime of the database operation. To reduce this cache miss penalty, a conventional database management system may switch between multiple execution threads. For example, when a first execution thread encounters a cache miss, the database management system may switch to a second execution thread while data missing from the cache is fetched from the main memory. Nevertheless, cache misses may still stall individual execution threads. Moreover, switching between different execution threads may impose significant overhead.

In some example embodiments, to minimize the penalty imposed by a cache miss, a database operation may be implemented as a coroutine. As used herein, a coroutine may refer to a function that may be suspended and resumed during execution without lower overhead than switching between different execution threads. For example, a database management system performing the database operation may suspend the performance of the database operation until data required to perform the database operation is fetched from the main memory. While the performance of the database operation is suspended, the database management system may perform other database operations, thereby minimizing the cache miss penalty associated with the suspended database operation.

In some example embodiments, the database management system may further reduce the frequency of cache misses that arise during the performance of a database operation by generating one or more memory pages based on the data access pattern associated with the database operation. These memory pages may include data that is known to be required by the database operation. As such, loading these memory pages into the cache may increase the temporal and/or spatial locality of the cache, thereby reducing the frequency of cache misses.

Figure 1:
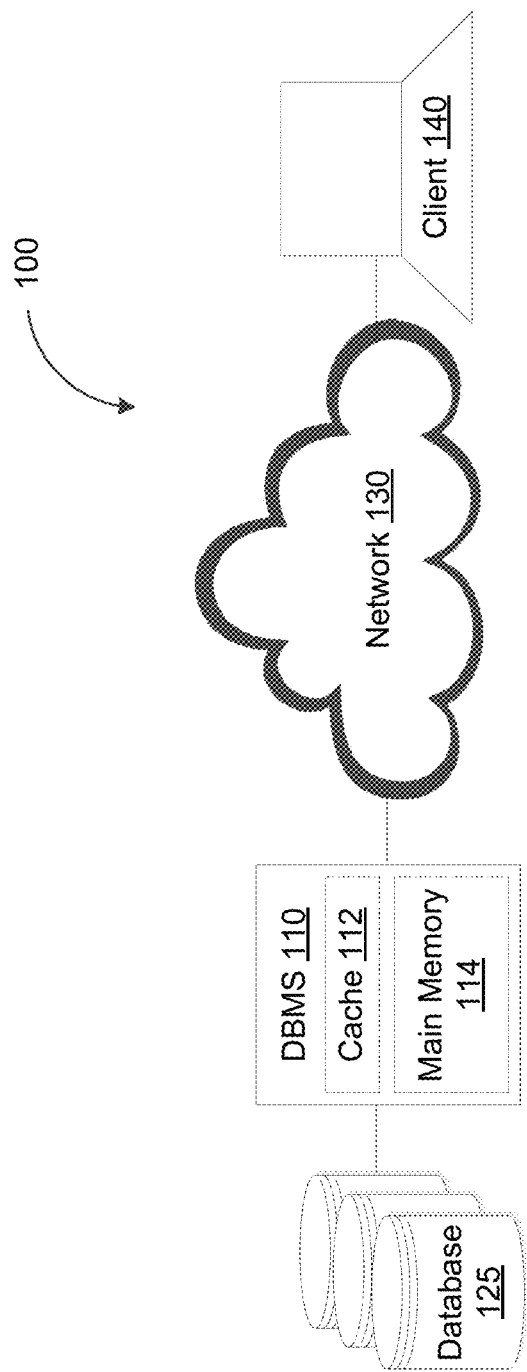
FIG. 1 depicts a system diagram illustrating an architecture of a database system, in accordance with some example embodiments.

FIG. 1 depicts a system diagram illustrating an architecture of a database system 100, in accordance with some example embodiments. Referring to FIG. 1A, the database system 100 may include a database management system (DBMS) 110 and a database 125. As shown in FIG. 1, the database management system 110 may include a cache 112 and a main memory 114. The database management system 110 may support a variety of operations for accessing data held in the database 125. For instance, these operations may include structured query language (SQL) statements and/or the like. Meanwhile, the database 125 may be any type of persistence including, for example, data structures such as, for example trees, vectors, arrays, and/or the like, and/or databases such as, for example, including, for example, an in-memory database, a relational database, a non-SQL (NoSQL) database, and/or the like.

As shown in FIG. 1, the database management system 110 may be communicatively coupled, via a network 130, with one or more clients including, for example, a client 140. The client 140 may be any type of processor-based device including, for example, a wearable device, a smartphone, a tablet personal computer (PC), a desktop computer, a laptop computer, and/or the like. Meanwhile, the network 130 may be a wired and/or wireless network including, for example, a wide area network (WAN), a local area network (LAN), a public land mobile network (PLMN), the Internet, and/or the like.

The client 140 may interact with the database management system 110 in order to access data records stored at the database 125. For example, the client 140 may send, to the database management system 110, one or more requests to access the data records stored at the database 125. The database management system 110 may respond to these requests from the client 140 by performing one or more corresponding database operations. In some example embodiments, the database management system 110 may perform a database operation that requires data from the cache 112 and/or the main memory 114. For example, the database management system 110 may perform the database operation by accessing the cache 112 in order to locate the data required to perform the database operation. When the data required to perform the database operation cannot be found in the cache 112, the database management system 110 may access the main memory 114 in order to fetch the data required to perform the database operation. Here, the database management system 110 may load, into the cache 112, the data fetched from the main memory 114. It should be appreciated that the accesses to the main memory 114, for example, to fetch data to perform database operations, may be unpredictable, thereby thwarting efforts to pre-fetch data from the main-memory 114.

To further illustrate, the database management system 110 may perform a database operation such as, for example, an index join on one or more tables stored at the database 125 including, for example, Table A and Table B. The index join on Table A and Table B may combine one or more columns from Table A and Table B without having to access Table B at the database 125. Instead, the columns from Table A and Table B may be combined based on the index associated with each table, which may be stored in the cache 112 and/or the main memory 114. As such, in order to perform the index join on Table A and Table B, the database management system 110 may access the cache 112 to locate at least a portion of the indices associated with Table A and/or Table B. Alternatively and/or additionally, the database management system 110 may access the main memory 114 to fetch at least a portion of the indices associated with Table A and/or Table B. The database management system 110 may access the main memory 114 in the event of a cache miss, when the portion of the indices required to perform the index join on Table A and Table B is absent from the cache 112. It should be appreciated that the frequency of such cache misses may increase the more the indices associated with Table A and/or Table B exceed the capacity of the cache 112.

A cache miss may incur a cache miss penalty including, for example, additional runtime for a database operation. The cache miss penalty may arise because accessing the main memory 114 to fetch data required to perform the database operation (e.g., an index join and/or the like) may increase the runtime of the database operation. Thus, in some example embodiments, the database management system 110 may reduce the cache miss penalty by at least interleaving the executed of multiple database operations that have been implemented as coroutines. As used herein, a coroutine may refer to a function that is capable of suspending execution and resuming execution at a later point. That is, a single instance of the coroutine may be suspended and resumed multiple times during execution. In some example embodiments, the database management system 110 may implement these database operations as stackless coroutines that do not make use of a memory stack instead of and/or in addition to stackful coroutines that do make use of a memory stack. Stackless coroutines interleaved with even less overhead than stackful coroutines.

A database operation may be implemented as a coroutine by at least defining the database operation as a coroutine. By contrast, a single instance of a conventional function and/or a conventional procedure must be executed to completion. As such, when a first database operation is implemented as a coroutine, the database management system 110 may suspend performance of the first database operation when the data required to continue performing the first database operation is absent from the cache 112. The database management system 110 may further switch to performing a second database operation while the data required to continue performing the first database operation is being fetched from the main memory 114.

Table 1 below depicts pseudo programming code implementing a tree lookup database operation as a coroutine.

TABLE 1

```
1    coroutine tree_lookup(
2        tree, tree_height, value, interleave
3    ){
4        node = tree->root
5        while node->level > 0 do
6            i_l = node->keylist; i_n = node->nKeys
7            handle = lookup(i_l, i_n, value, false)
8            i_c = node->firstChild
9            node = i_c + handle.getResult( )
10           if interleave then
11               prefetch node
12               co_await syspend_always( )
13           l_kl = node->keyList; l_n = node->nKeys
14           handle = lookup(l_kl, l_n, value, false)
15           l_vl = node->valueList
16           co_return l_vl(handle.getResult( )]
17   }
```

As noted, the database management system 110 may reduce cache miss penalty by at least performing one or more database operations that have been implemented as coroutines. For instance, the database management system 110 may perform a first database operation that has been implemented as a coroutine. Because the first database operation is implemented as a coroutine, performance of the first database operation may be suspended in the event of a cache miss, which may occur, for example, when data required to perform the first database operation cannot be found in the cache 112. It should be appreciated that performance of the first database operation may remain suspended until the data required to perform the first database operation has been fetched from the main memory 114. While the performance of the first database operation is suspended, the database management system 110 may continue to perform one or more other database operations including, for example, a second database operation. The second database operation may or may not be implemented as a coroutine, for example, by being defined as a coroutine. By interleaving the performance of the first database operation and the second database operation, the database management system 110 may reduce the cache miss penalty engendered by the first database operation.

Figure 2A:
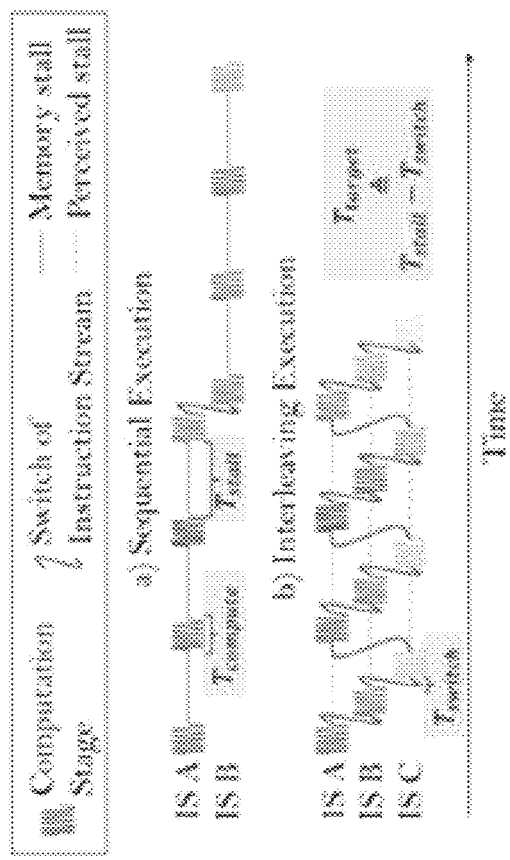
FIG. 2A depicts sequential execution and interleaved execution, in accordance with some example embodiments.

To further illustrate, FIG. 2A depicts sequential execution and interleaved execution, in accordance with some example embodiments. Referring to FIG. 2A, the database management system 110 may perform one or more database operations by at least executing a plurality of corresponding instruction streams including, for example, a first instruction stream denoted as IS A, a second instruction stream denoted as IS B, and/or a third instruction stream denoted as IS C. It should be appreciated that the first instruction stream IS A, the second instruction stream IS B, and the third instruction stream IS C may be associated with the same and/or different database operation. As shown in FIG. 2A, the database management system 110 may execute the first instruction stream IS A, the second instruction stream IS B, and the third instruction stream IS C sequentially. For instance, the database management system 110 may run the second instruction stream IS B only after the database management system 110 has finished running the first instruction stream after running the first instruction stream IS A.

When the first instruction stream IS A, the second instruction stream IS B, and the third instruction stream IS C are executed sequentially, the database management system 110 may stall whenever the database management system 110 is required to access the main memory 114 to fetch data because the data required to continue execution is absent from the cache 112. The penalty imposed by these cache misses may correspond to the duration of the stalls, which may be denoted as $T_{stall}$ in FIG. 2A. Meanwhile, the duration of each computation stage in which the database management system 110 is running at least a portion of the first instruction stream IS A, the second instruction stream IS B, and the third instruction stream IS C may be denoted as $T_{compute}$ in FIG. 2A. As shown in FIG. 2A, sequential execution of different instruction streams may be associated with a significant cache miss penalty due to frequent and lengthy stalls during which the database management system 110 may be stopped from executing any instructions while waiting for data to be fetched from the main memory 114.

By contrast, the database management system 110 may interleave the execution of the first instruction stream IS A, the second instruction stream IS B, and the third instruction stream IS C instead of and/or in addition to sequentially executing the first instruction stream IS A, the second instruction stream IS B, and the third instruction stream IS C if the one or more database operations associated with the first instruction stream IS A, the second instruction stream IS B, and the third instruction stream IS C are implemented as coroutines. For instance, in some example embodiments, the one or more database operations associated with first instruction stream IS A, the second instruction stream IS B, and the third instruction stream IS C may be implemented as coroutines, which may be suspended and/or resumed as needed. As such, the database management system 110 switch between executing the first instruction stream IS A, the second instruction stream IS B, and/or the third instruction stream IS C whenever the database management system 110 expects a cache miss that requires data to be fetched from the main memory 114.

As shown in FIG. 2A, the database management system 110 may suspend execution of the first instruction stream IS A when the data required to continue executing the first instruction stream IS A is absent from the cache 112. While the execution of the first instruction stream IS A is suspended, the database management system 110 may switch to executing the second instruction stream IS B and/or the third instruction stream IS C. The database management system 110 may resume executing the first instruction stream IS A when the data required to continue executing the first instruction stream IS A has been fetched from the main memory 114. In order to resume execution of the first instruction stream IS A, the database management system 110 may suspend execution of the second instruction stream IS B and/or the third instruction stream IS C. In doing so, the database management system 110 may minimize and/or eliminate $T_{stall}$. That is, a cache miss may no longer impose a lengthy stall (e.g., $T_{stall}$) during which the database management system 110 may be stopped from executing any instructions while waiting for data to be fetched from the main memory 114. Instead, when the database management system 110 encounters a cache miss during the execution of one instruction stream, the database management system 110 may suspend execution of that execution stream and switch to executing a different instruction stream while data is being fetched from the main memory 114. Here, the database management system 110 may incur a switch overhead denoted as $T_{switch}$ in FIG. 2. The switch overhead $T_{switch}$ may correspond to a quantity of time required to switch from one instruction stream to another instruction stream. It should be appreciated that $T_{switch}$ may be less than the typical cache miss penalty $T_{stall}$.

In some example embodiments, the database management system 110 may determine a quantity of interleaved instruction streams for achieving optimal performance. For instance, the optimal quantity G of interleaved instruction streams may be determined based on Equation (1) below.

$$G \geq \frac{T_{target}}{T_{compute} + T_{switch}} + 1 \quad (1)$$

wherein $T_{compute}$ may correspond to a duration of one or more computation stages during which different instruction streams may execute, $T_{switch}$ may correspond to an overhead associated with switching from one instruction stream to another instruction stream, and $T_{target}$ may a difference between the duration of stalls $T_{stall}$ and the switch overhead $T_{switch}$ (e.g., $T_{target}=T_{stall}-T_{switch}$). It should be appreciated that the optimal quantity G of interleaved instruction streams may correspond to a minimum quantity of interleaved instructions streams necessary to minimize and/or eliminate $T_{stall}$. But as Equation (1) indicates, increasing the quantity of interleaved instruction streams beyond the minimum quantity necessary to eliminate $T_{stall}$ may cause performance to deteriorate, for example, by introducing conflicts at the cache 112.

According to some example embodiments, the database management system 110 may also be configured to reduce the frequency of cache misses triggered by a database operation by at least generating one or more memory pages based on the data access pattern associated with the database operation. In doing so, the one or more memory pages may include data that are known to be required by the database operation instead of and/or in addition to data not required by the database operation. These memory pages may be stored at the main memory 114 instead of and/or in addition to memory pages storing an arbitrary selection of data. Moreover, these memory pages may be loaded from the main memory 114 into the cache 112 when the database management system 110 is performing the database operation. Loading these memory pages, which include the data required by the database operation instead of an arbitrary selection of data, into the cache 112 may increase the spatial and/or temporal locality of the cache 112.

For example, the database management system 110 may perform a database operation such as, for example, a binary search on an index. Performing the binary search on the index may require accessing certain elements within an array corresponding to the index. As such, based on the access pattern associated with the binary search, the database management system 110 may generate one or more memory pages that include these elements from the array. The database management system 110 may further save these memory pages to the main memory 114. In some example embodiments, the database management system 110 may load these memory pages from the main memory 114 into the cache 112 when the database management system 110 is performing a binary search on the index. Loading these memory pages into the cache 112 may reduce the frequency of cache misses associated with performing the binary search because at least a portion of the data required to perform the binary search may be available in the cache 112 instead of having to be fetched from the main memory 114.

Figure 2B:
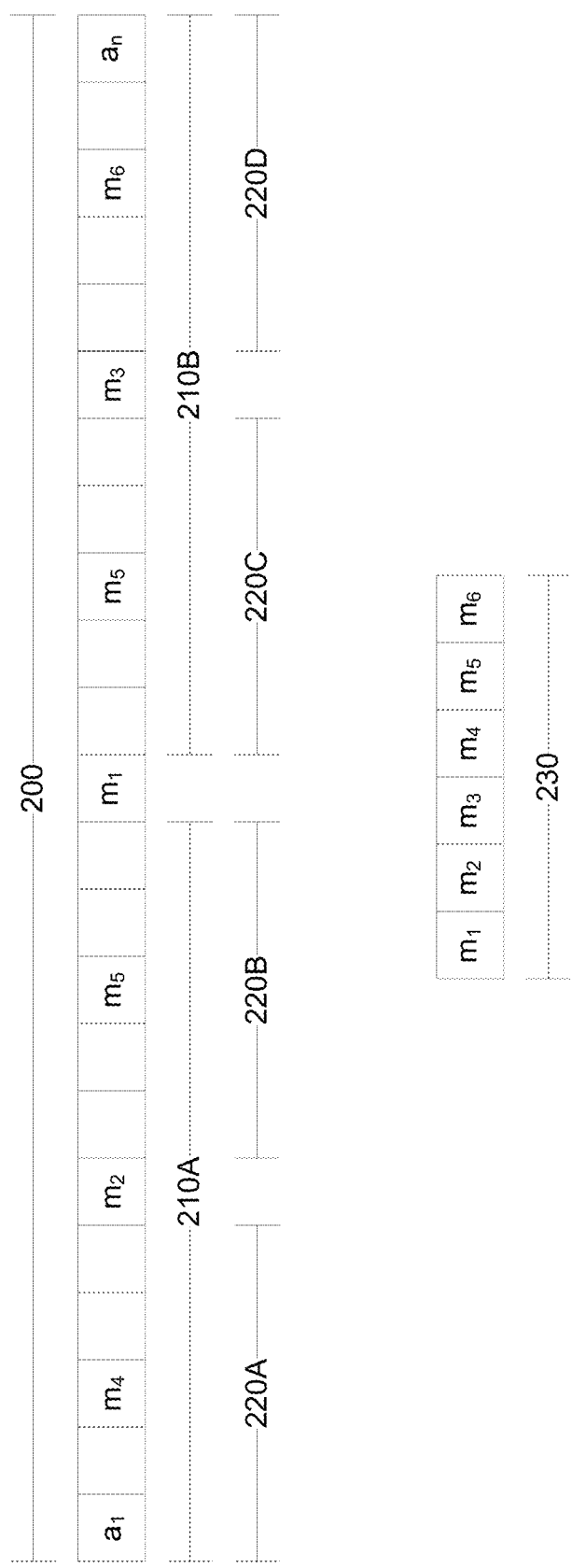
FIG. 2B depicts a data access pattern, in accordance with some example embodiments.

To further illustrate, FIG. 2B depicts a data access pattern, in accordance with some example embodiments. As shown in FIG. 2B, an index may be represented by a sorted array 200 that includes an n quantity of elements and denoted by $a=(a_1\ a_2\ a_3\ \ldots\ a_n)$. Performing a binary search on the index may require accessing certain elements from the sorted array 200 in order to locate a target value v. For example, performing the binary search on the index may require accessing a first middle element $m_1$ of the sorted array 200 in order to determine whether the target value v is equal to the first middle element $m_1$ of the sorted array 200. If the target value v is less than the first middle element $m_1$ of the sorted array 200, the target value v may be located in a first half interval 210A of the sorted array 200. As such, the binary search may continue by accessing a second middle element $m_2$ of the first half interval 210A. Furthermore, the binary search of the index may continue by accessing a fourth middle element $m_4$ of a first quarter interval 220A of the sorted array 200 if the target value v is less than the second middle element $m_2$ and/or a fifth middle element $m_5$ of a second quarter interval 220B of the sorted array 200 if the target value v is greater than the second middle element $m_2$.

Alternatively and/or additionally, if the target value v is greater than the first middle element $m_1$ of the sorted array 200, the binary search may continue by accessing a third middle element $m_3$ of a second half interval 210B of the sorted array 200. The binary search of the index may further continue by accessing a fifth middle element $m_4$ of a third quarter interval 220C of the sorted array 200 if the target value v is less than the third middle element $m_3$ and/or a sixth middle element $m_6$ of a fourth quarter interval 220D of the sorted array 200 if the target value v is greater than the third middle element $m_3$.

It should be appreciated that the binary search on the index may continue by iteratively accessing the middle element of one or more successive half intervals within the sorted array 200 until an element matching the target value v is found and/or until no half intervals remain. The resulting data access pattern may include accessing a plurality of middle elements including, for example, the first middle element $m_1$, the second middle element $m_2$, the third middle element $m_3$, the fourth middle element $m_4$, the fifth middle element $m_5$, the sixth middle element $m_6$, and/or the like. Accordingly, in some example embodiments, the database management system 110 may generate one or more memory pages including, for example, a memory page 230. As shown in FIG. 2B, the memory page 230 may include the first middle element $m_1$, the second middle element $m_2$, the third middle element $m_3$, the fourth middle element $m_4$, the fifth middle element $m_5$, and the sixth middle element $m_6$. As noted, performing the binary search on the sorted array 200 may require accessing the first middle element $m_1$, the second middle element $m_2$, the third middle element $m_3$, the fourth middle element $m_4$, the fifth middle element $m_5$, the sixth middle element $m_6$. Thus, generating the memory page 230 and loading the memory page 230 into the cache 112 may reduce the frequency of cache misses by at least ensuring that the data known to be required by the binary search are available within the cache 112.

Figure 3:
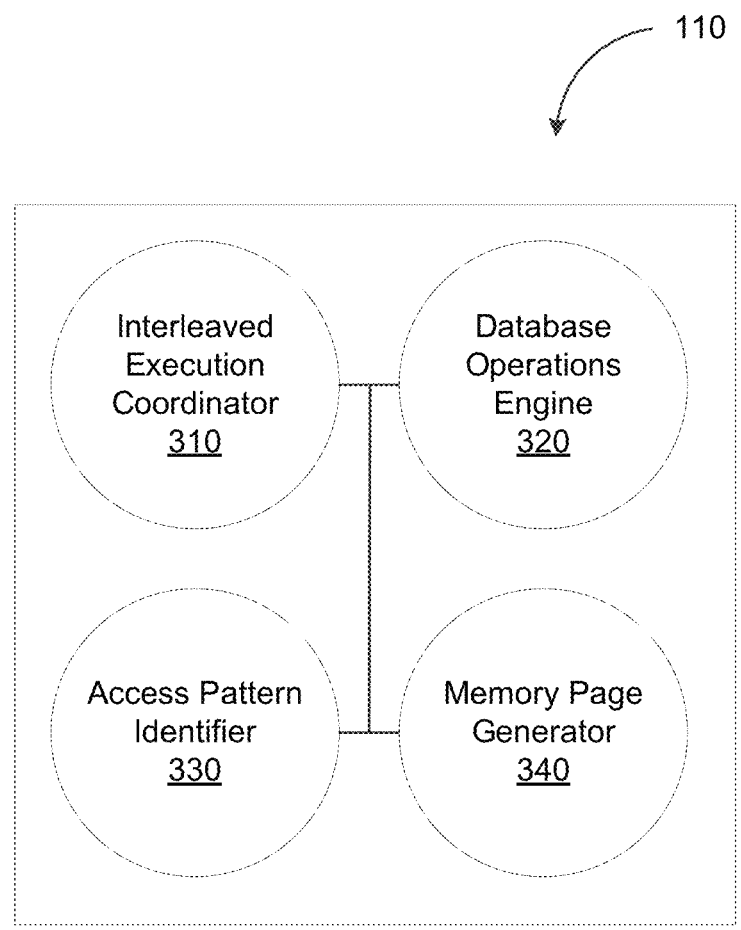
FIG. 3 depicts a database management system, in accordance with some example embodiments.

FIG. 3 depicts a block diagram illustrating the database management system 110, in accordance with some example embodiments. Referring to FIGS. 1, 2A-B, and 3, the database management system 110 may include an interleaved execution coordinator 310, a database operations engine 320, an access pattern identifier 330, and a memory page generator 340. It should be appreciated that the structured data validation engine 110 may include additional and/or different components than shown.

In some example embodiments, the interleaved execution coordinator 310 may be configured to determine a quantity of interleaved instructions streams for achieving optimal performance. It should be appreciated that each instruction stream may correspond a database operation such as, for example, an index join and/or the like. Moreover, some data operations may be associated with multiple instruction streams, for example, to lookup multiple values in an index. As noted, the quantity of interleaved instruction streams for achieving optimal performance may be determined based on Equation (1) above. For instance, the optimal quantity of interleaved instructions streams may correspond to a minimum quantity of interleaved instructions streams necessary to minimize and/or eliminate $T_{stall}$, which may correspond to a duration of time during which the database management engine 110 is stopped from executing any instructions while the data required to continue executing one or more instruction streams is fetched from the main memory 114. Interleaving the execution of an optimal quantity of instruction streams may minimize and/or eliminate $T_{stall}$. However, interleaving a larger than optimal quantity of instruction streams may introduce conflicts at the cache 112, thereby causing a deterioration in performance.

In some example embodiments, the database operations engine 320 may be configured to perform a plurality of database operations by at least interleaving the execution of the corresponding instruction streams. Referring to FIG. 2A, the database operations engine 320 may perform one or more database operations by at least interleaving the execution of the first instruction stream IS A, the second instruction stream IS B, and the third instruction stream IS C. As noted, the database operations engine 320 may be able to interleave the execution of the first instruction stream IS A, the second instruction stream IS B, and the third instruction stream IS C because the corresponding database operations may be implemented as coroutines.

Interleaving the execution of the first instruction stream IS A, the second instruction stream IS B, and the third instruction stream IS C may include switching between the first instruction stream IS A, the second instruction stream IS B, and/or the third instruction stream IS C whenever the database operations engine 320 encounters a cache miss that requires data to be fetched from the main memory 114. For instance, the database operations engine 320 may suspend execution of the first instruction stream IS A when the data required to continue executing the first instruction stream IS A is absent from the cache 112. While the execution of the first instruction stream IS A is suspended, the database operations engine 320 may switch to executing the second instruction stream IS B and/or the third instruction stream IS C. The database operations engine 320 may resume executing the first instruction stream IS A when the data required to continue executing the first instruction stream IS A has been fetched from the main memory 114.

In some example embodiments, the access pattern identifier 330 may be configured to identify the access pattern associated with a database operation. Meanwhile, the memory page generator 340 may be configured to generate one or more memory pages based on the access pattern associated with the database operation. The one or more memory pages may include data that are known to be required by the database operation. To further illustrate, as shown in FIG. 2B, performing a binary search on an index may require accessing certain elements from the sorted array 200 corresponding to the index including, for example, the middle element from the sorted array 200 and/or the middle element from each successive half interval of the sorted array 200. The access pattern identifier 330 may identify the access pattern associated with the binary search such that the memory page generator 340 may generate one or more memory pages (e.g., the memory page 230) that include the middle element from the sorted array and/or the middle element from each successive half interval of the sorted array 200. As noted, loading these memory pages into the cache 112 may reduce the frequency of cache misses because at least a portion of the data required to perform the binary search may be available in the cache 112 instead of having to be fetched from the main memory 114. Furthermore, the loading of these memory pages into the cache 112 may maximize the use of the data (e.g., cache lines) stored in the cache 112 because the data stored in the cache 112 are certain to be used for performing the binary search.

Figure 4A:
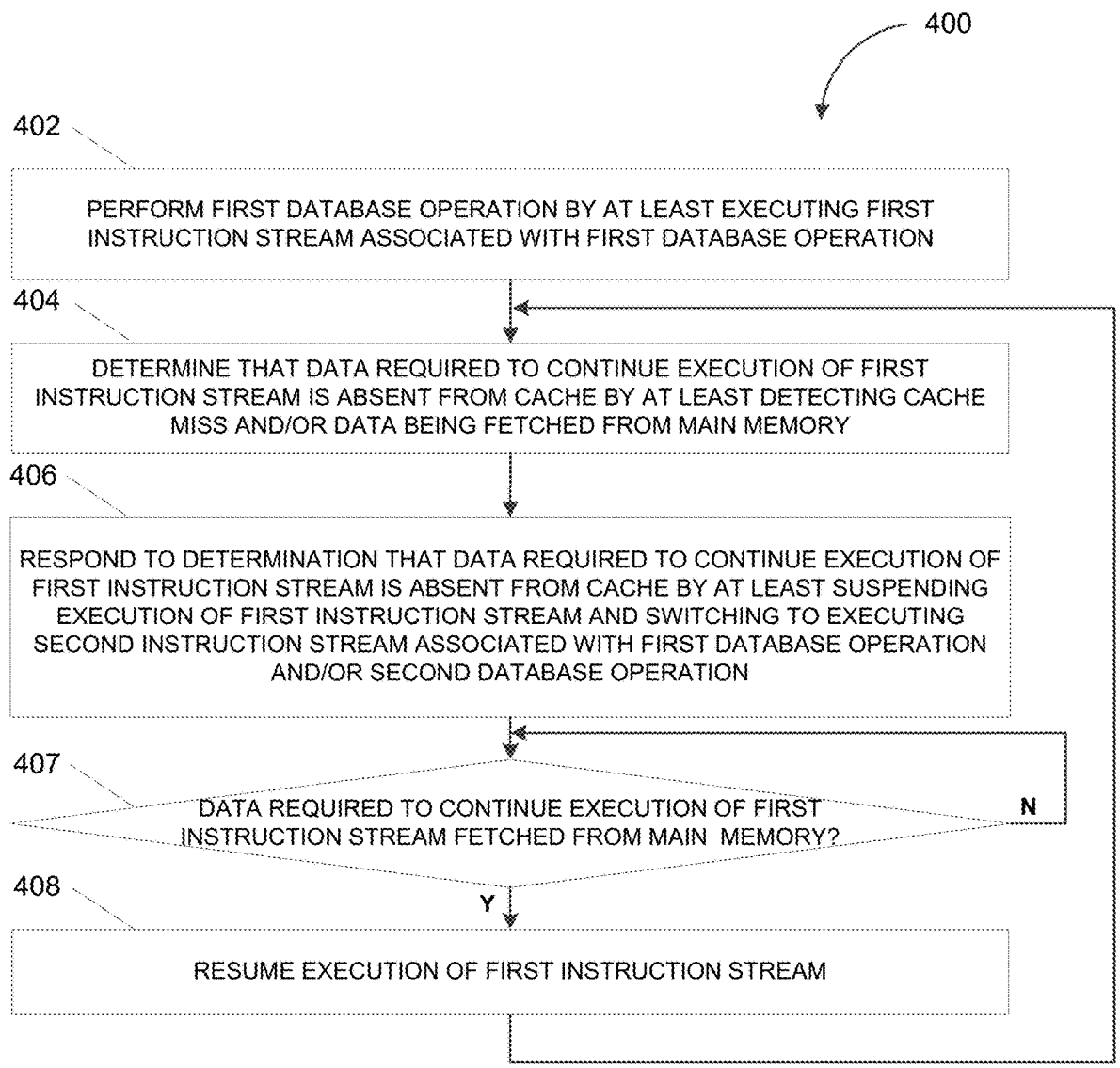
FIG. 4A depicts a flowchart illustrating a process for reducing cache miss penalty, in accordance with some example embodiments.

FIG. 4A depicts a flowchart illustrating a process 400 for reducing cache miss penalty, in accordance with some example embodiments. Referring to FIGS. 1, 2A-B, 3, and 4A, the process 400 may be performed by the database management system 110.

At 402, the database management system 110 may perform a first database operation by at least executing a first instruction stream associated with the first database operation. For instance, as shown in FIG. 2A, the database management system 110 may execute the first instruction stream IS A, which may be associated with a database operation such as, for example, an index join and/or the like.

At 404, the database management system 110 may determine that data required to continue execution of the first instruction stream is absent from the cache 112 by at least detecting a cache miss and/or data being fetched from the main memory 114. As noted, a cache miss may occur when the data required to continue executing the first instruction stream IS A is absent from the cache 112 and must be fetched from the main memory 114.

At 406, the database management system 110 may respond to the determination that the data required to continue execution of the first instruction stream is absent from the cache 112 by at least suspending execution of the first instruction stream and switching to executing a second instruction stream associated with the first database operation and/or a second database operation. In some example embodiments, the first database operation may be implemented as a coroutine, thereby enabling the database management system 110 to suspend and/or resume the execution of the first instruction stream IS A as needed. For instance, as shown in FIG. 2A, the database management system 110 may interleave the execution of the first instruction stream IS A with the execution of one or more other instruction streams including, for example, the second instruction stream IS B and/or the third instruction stream IS C. The first instruction stream IS A, the second instruction stream IS B and the third instruction stream IS C may be associated with at least one database operation that has been implemented as a coroutine. The database management system 110 may suspend execution of the first instruction stream IS A when the data required to continue executing the first instruction stream IS A is absent from the cache 112. While the execution of the first instruction stream IS A is suspended, the database management system 110 may switch to executing the second instruction stream IS B and/or the third instruction stream IS C.

At 407, the database management system 110 may determine whether the data required to continue execution of the first instruction stream has been fetched from the main memory 114. The database management system 110 may, at 407-N, determine that the data required to continue execution of the first instruction stream has not been fetched form the main memory 114. As such, the database management system 110 may continue the process 400 at operation 407 in which the database management system 110 continue to check whether the data required to continue execution of the first instruction stream has been fetched from the main memory 114. Alternatively and/or additionally, the database management system 110 may, at 407-Y, determine that the data required to continue execution of the first instruction stream has been fetched form the main memory 114. Here, at 408, the database management system 110 may resume execution of the first instruction stream. For instance, in some example embodiments, the database management system 110 may resume executing the first instruction stream IS A when the data required to continue executing the first instruction stream IS A has been fetched from the main memory 114. In order to resume execution of the first instruction stream IS A, the database management system 110 may suspend execution of the second instruction stream IS B and/or the third instruction stream IS C.

It should be appreciated that upon resuming execution of the first execution stream at 408, the process 400 may further continue at operation 404 in which the database management system 110 may again determine that data required to continue execution of the first instruction stream is absent from the cache 112.

Figure 4B:
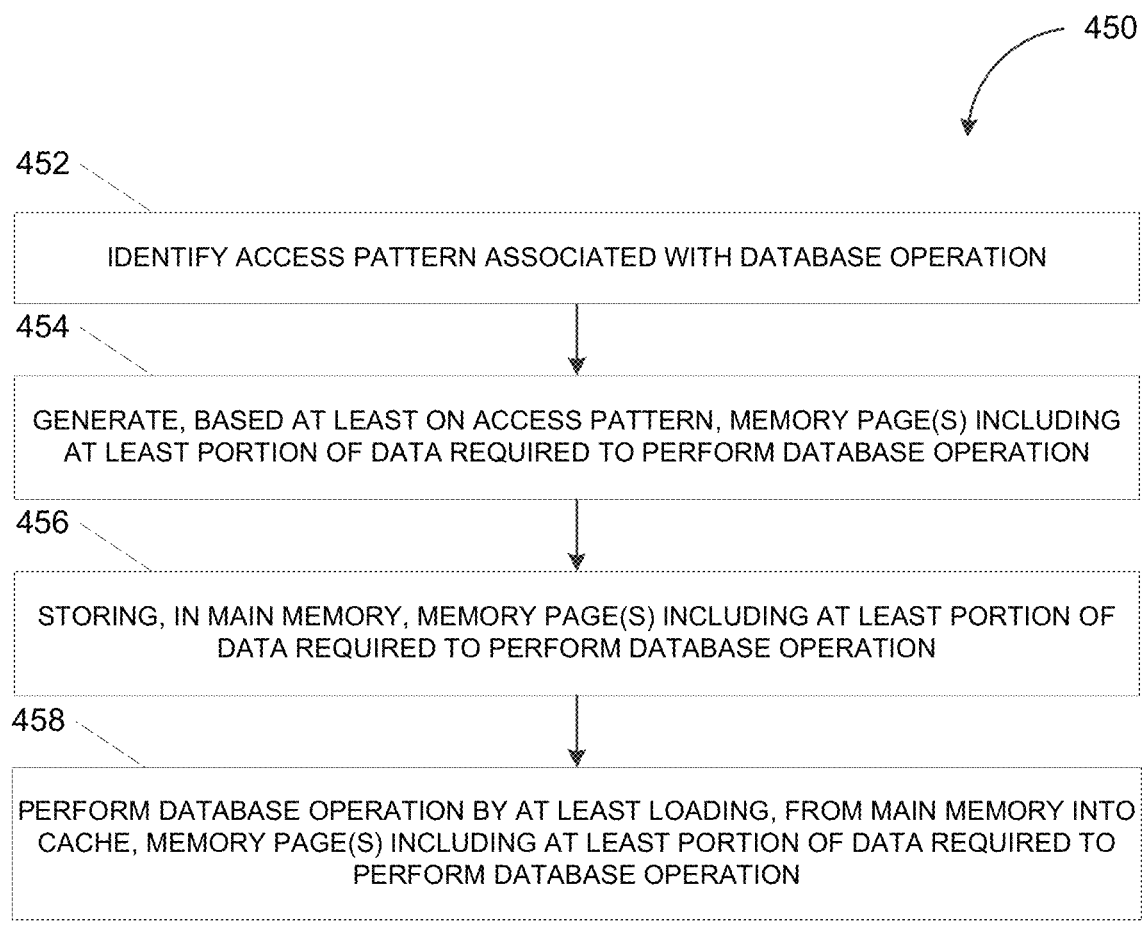
FIG. 4B depicts a flowchart illustrating a process for reducing a frequency of cache misses, in accordance with some example embodiments.

FIG. 4B depicts a flowchart illustrating a process 450 for reducing a frequency of cache misses, in accordance with some example embodiments. Referring to FIGS. 1, 2A-B, 3, and 4B, the process 400 may be performed by the database management system 110.

At 452, the database management system 110 may identify an access pattern associated with a database operation. For example, as shown in FIG. 2B, to perform a binary search on an index may require accessing the middle element in the corresponding sorted array 200 and/or the middle element in one or more successive half intervals of the sorted array 200. Identifying the access pattern associated with the database operation may enable the database management system 110 to determine at least a portion of the data that are required to perform the database operation.

At 454, the database management system 110 may generate, based at least on the access pattern, one or more memory pages including at least a portion of the data required to perform the database operation. In some example embodiments, the database management system 110 may generate one or more memory pages to include data that are known to be required by the database operation. For instance, the database management system 110 may generate, for a binary search of an index, the memory page 230 to include the middle element in the sorted array 200 corresponding to the index and/or the middle element in one or more successive half intervals of the sorted array 200. As noted, performing a binary search on the corresponding index may require accessing the middle element in the sorted array 200 and/or the middle element in one or more successive half intervals of the sorted array 200.

At 456, the database management system 110 may store, in the main memory 114, the one or more memory pages including at least the portion of the data required to perform the database operation. In some example embodiments, the memory pages including the data required to perform the database operation (e.g., the binary search on the index corresponding to the sorted array 200) may be stored to the main memory 114. These memory pages may be stored to the main memory 114 instead of and/or in addition to memory pages including an arbitrary selection of data, which may or may not be required for performing the database operation.

At 458, the database management system 110 may perform the database operation by at least loading, from the main memory 114 into the cache 112, the one or more memory pages including at least the portion of the data required to perform the database operation. For instance, the database management system 110 may perform the binary search on the index corresponding to the sorted array 200 by at least loading the memory page 230 from the main memory 114 into the cache 112. Because the memory page 230 includes at least a portion of the data required to perform the binary search, loading the memory page 230 into the cache 112 may reduce the frequency of cache misses associated with the binary search by at least increasing the temporal and/or spatial locality of the cache 112. For example, loading the memory page 230 into the cache 112 may obviate accesses to the main memory 114 because the middle element from the sorted array 200 and/or the middle element from each successive half interval of the sorted array 200, which may be required for performing the binary search, are available at the cache 112 and do not have to be retrieved from the main memory 114.

Figure 5:
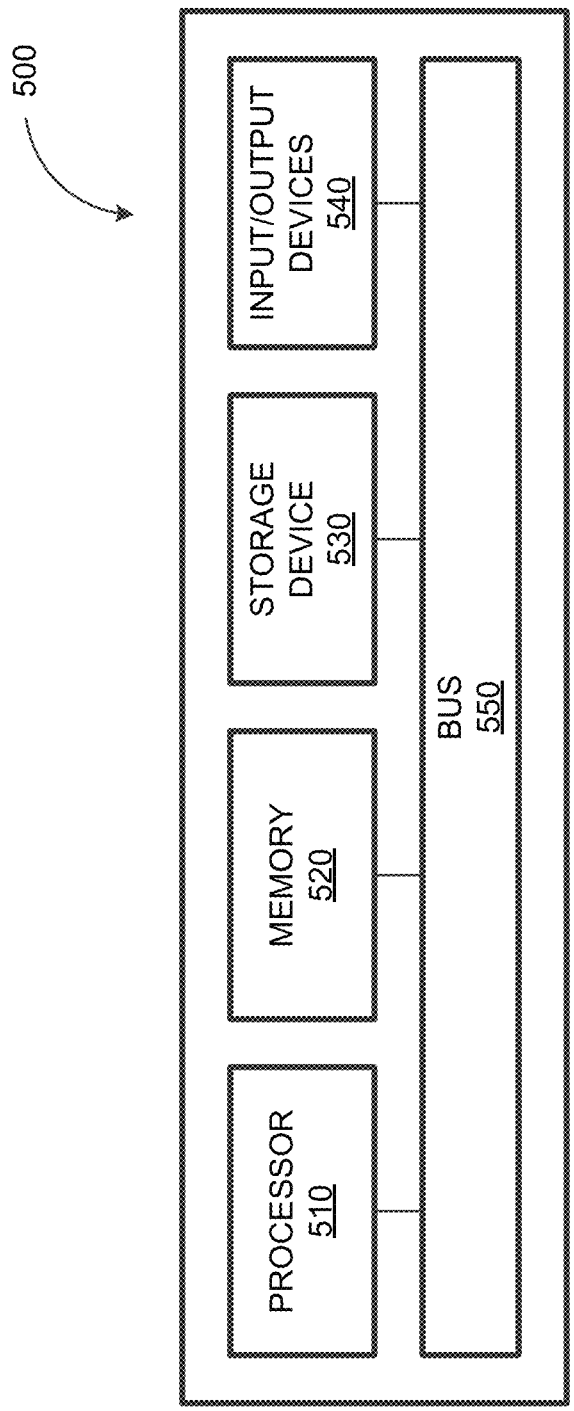
FIG. 5 depicts a block diagram illustrating a computing system, in accordance with some example embodiments.

FIG. 5 depicts a block diagram illustrating a computing system 500 consistent with implementations of the current subject matter. Referring to FIGS. 1 and 5, the computing system 500 can be used to implement the database management system 110 and/or any components therein.

As shown in FIG. 5, the computing system 500 can include a processor 510, a memory 520, a storage device 530, and input/output devices 540. The processor 510, the memory 520, the storage device 530, and the input/output devices 540 can be interconnected via a system bus 550. The processor 510 is capable of processing instructions for execution within the computing system 500. Such executed instructions can implement one or more components of, for example, the database management system 110. In some example embodiments, the processor 510 can be a single-threaded processor. Alternately, the processor 510 can be a multi-threaded processor. The processor 510 is capable of processing instructions stored in the memory 520 and/or on the storage device 530 to display graphical information for a user interface provided via the input/output device 540.

The memory 520 is a computer readable medium such as volatile or non-volatile that stores information within the computing system 500. The memory 520 can store data structures representing configuration object databases, for example. The storage device 530 is capable of providing persistent storage for the computing system 500. The storage device 530 can be a floppy disk device, a hard disk device, an optical disk device, or a tape device, or other suitable persistent storage means. The input/output device 540 provides input/output operations for the computing system 500. In some example embodiments, the input/output device 540 includes a keyboard and/or pointing device. In various implementations, the input/output device 540 includes a display unit for displaying graphical user interfaces.

According to some example embodiments, the input/output device 540 can provide input/output operations for a network device. For example, the input/output device 540 can include Ethernet ports or other networking ports to communicate with one or more wired and/or wireless networks (e.g., a local area network (LAN), a wide area network (WAN), the Internet).

In some example embodiments, the computing system 500 can be used to execute various interactive computer software applications that can be used for organization, analysis and/or storage of data in various formats. Alternatively, the computing system 500 can be used to execute any type of software applications. These applications can be used to perform various functionalities, e.g., planning functionalities (e.g., generating, managing, editing of spreadsheet documents, word processing documents, and/or any other objects, etc.), computing functionalities, communications functionalities, etc. The applications can include various add-in functionalities (e.g., SAP Integrated Business Planning as an add-in for a spreadsheet and/or other type of program) or can be standalone computing products and/or functionalities. Upon activation within the applications, the functionalities can be used to generate the user interface provided via the input/output device 540. The user interface can be generated and presented to a user by the computing system 500 (e.g., on a computer screen monitor, etc.).

One or more aspects or features of the subject matter described herein can be realized in digital electronic circuitry, integrated circuitry, specially designed ASICs, field programmable gate arrays (FPGAs) computer hardware, firmware, software, and/or combinations thereof. These various aspects or features can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device. The programmable system or computing system may include clients and servers. A client and server are generally remote from each other and typically interact through a communication network. The relationship of client and server arises by virtue of computer programs running on the respective computers and having a client-server relationship to each other.

These computer programs, which can also be referred to as programs, software, software applications, applications, components, or code, include machine instructions for a programmable processor, and can be implemented in a high-level procedural and/or object-oriented programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid-state memory or a magnetic hard drive or any equivalent storage medium. The machine-readable medium can alternatively or additionally store such machine instructions in a transient manner, such as for example, as would a processor cache or other random access memory associated with one or more physical processor cores.

To provide for interaction with a user, one or more aspects or features of the subject matter described herein can be implemented on a computer having a display device, such as for example a cathode ray tube (CRT) or a liquid crystal display (LCD) or a light emitting diode (LED) monitor for displaying information to the user and a keyboard and a pointing device, such as for example a mouse or a trackball, by which the user may provide input to the computer. Other kinds of devices can be used to provide for interaction with a user as well. For example, feedback provided to the user can be any form of sensory feedback, such as for example visual feedback, auditory feedback, or tactile feedback; and input from the user may be received in any form, including acoustic, speech, or tactile input. Other possible input devices include touch screens or other touch-sensitive devices such as single or multi-point resistive or capacitive track pads, voice recognition hardware and software, optical scanners, optical pointers, digital image capture devices and associated interpretation software, and the like.

In the descriptions above and in the claims, phrases such as "at least one of" or "one or more of" may occur followed by a conjunctive list of elements or features. The term "and/or" may also occur in a list of two or more elements or features. Unless otherwise implicitly or explicitly contradicted by the context in which it used, such a phrase is intended to mean any of the listed elements or features individually or any of the recited elements or features in combination with any of the other recited elements or features. For example, the phrases "at least one of A and B;" "one or more of A and B;" and "A and/or B" are each intended to mean "A alone, B alone, or A and B together." A similar interpretation is also intended for lists including three or more items. For example, the phrases "at least one of A, B, and C;" "one or more of A, B, and C;" and "A, B, and/or C" are each intended to mean "A alone, B alone, C alone, A and B together, A and C together, B and C together, or A and B and C together." Use of the term "based on," above and in the claims is intended to mean, "based at least in part on," such that an unrecited feature or element is also permissible.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and subcombinations of the disclosed features and/or combinations and subcombinations of several further features disclosed above. In addition, the logic flows depicted in the accompanying figures and/or described herein do not necessarily require the particular order shown, or sequential order, to achieve desirable results. Other implementations may be within the scope of the following claims.

What is claimed is:

1. A system, comprising:

at least one data processor; and at least one memory storing instructions which, when executed by the at least one data processor, cause operations comprising:

identifying an access pattern associated with a database operation, the database operation comprising a binary search on an index comprising a sorted array, the access pattern comprising data required to perform the database operation, and the data required to perform the database operation comprising a first middle element of the sorted array;

generating, based at least on the access pattern, one or more memory pages including at least a portion of the data required to perform the database operation;

storing, in a main memory, the one or more memory pages including at least the portion of the data required to perform the database operation; and performing the database operation by at least loading, from the main memory and into a cache, the one or more memory pages including at least the portion of the data required to perform the database operation.

2. The system of claim 1, wherein the one or more memory pages includes the first middle element.

3. The system of claim 1, wherein the data required to perform the database operation further comprises a second middle element of a first half interval of the sorted array and/or a third middle element of a second half interval of the sorted array.

4. The system of claim 3, wherein the one or more memory pages further includes the second middle element and/or the third middle element.

5. The system of claim 1, wherein the generation of the one or more memory reduces a frequency of cache misses when the one or more memory pages are loaded into the cache, and wherein the cache miss occurs due to the data required to perform the database operation being absent from the cache.

6. A computer-implemented method, comprising:

identifying an access pattern associated with a database operation, the database operation comprising a binary search on an index comprising a sorted array, the access pattern comprising data required to perform the database operation, and the data required to perform the database operation comprising a first middle element of the sorted array;

generating, based at least on the access pattern, one or more memory pages including at least a portion of the data required to perform the database operation;

storing, in a main memory, the one or more memory pages including at least the portion of the data required to perform the database operation; and performing the database operation by at least loading, from the main memory and into a cache, the one or more memory pages including at least the portion of the data required to perform the database operation.

7. The computer-implemented method of claim 6, wherein the one or more memory pages includes the first middle element.

8. The computer-implemented method of claim 6, wherein the data required to perform the database operation further comprises a second middle element of a first half interval of the sorted array and/or a third middle element of a second half interval of the sorted array.

9. The computer-implemented method of claim 8, wherein the one or more memory pages further includes the second middle element and/or the third middle element.

10. The computer-implemented method of claim 6, wherein the generation of the one or more memory reduces a frequency of cache misses when the one or more memory pages are loaded into the cache, and wherein the cache miss occurs due to the data required to perform the database operation being absent from the cache.

11. A non-transitory computer-readable medium storing instructions, which when executed by at least one data processor, result in operations comprising:

identifying an access pattern associated with a database operation, the database operation comprising a binary search on an index comprising a sorted array, the access pattern comprising data required to perform the database operation, and the data required to perform the database operation comprising a first middle element of the sorted array;

generating, based at least on the access pattern, one or more memory pages including at least a portion of the data required to perform the database operation;

storing, in a main memory, the one or more memory pages including at least the portion of the data required to perform the database operation; and performing the database operation by at least loading, from the main memory and into a cache, the one or more memory pages including at least the portion of the data required to perform the database operation.

12. The computer-readable medium of claim 11, wherein the one or more memory pages includes the first middle element.

13. The computer-readable medium of claim 11, wherein the data required to perform the database operation further comprises a second middle element of a first half interval of the sorted array and/or a third middle element of a second half interval of the sorted array.

14. The computer readable medium of claim 13, wherein the one or more memory pages further includes the second middle element and/or the third middle element.

15. The computer-readable medium of claim 11, wherein the generation of the one or more memory reduces a frequency of cache misses when the one or more memory pages are loaded into the cache, and wherein the cache miss occurs due to the data required to perform the database operation being absent from the cache.

* * * * *